United States Patent [19]

Kapura

[11] 4,345,929
[45] Aug. 24, 1982

[54] METHOD OF AND APPARATUS FOR VERTICALLY POSITIONING DEVICES IN GLASS FORMING CHAMBER

[75] Inventor: Edward M. Kapura, Carlisle, Pa.

[73] Assignee: PPG Industries, Inc., Pittsburgh, Pa.

[21] Appl. No.: 262,263

[22] Filed: May 11, 1981

[51] Int. Cl.³ ............................................. C03B 18/06
[52] U.S. Cl. .................................... 65/99.5; 65/99.2; 65/99.6; 65/182.4; 65/158
[58] Field of Search .................... 65/158, 182.4, 182.1, 65/99.2, 99.5, 99.6

[56] References Cited

U.S. PATENT DOCUMENTS

| | | | |
|---|---|---|---|
| 2,032,016 | 2/1936 | Hitner | 65/158 X |
| 2,380,436 | 7/1945 | Holdman | 73/290 |
| 2,977,797 | 4/1961 | Hoffmann et al. | 73/304 |
| 3,126,741 | 3/1964 | Weber-Klein | 73/290 |
| 3,453,460 | 7/1969 | Butler et al. | 310/11 |
| 3,482,954 | 12/1969 | Yuen | 65/29 |
| 3,500,548 | 3/1970 | Mitsuno | 33/174 |
| 3,528,795 | 9/1970 | Swillinger | 65/182 |
| 3,653,868 | 4/1972 | Swillinger | 65/182 R |
| 3,664,820 | 5/1973 | Montgomery | 65/99 A |
| 3,805,072 | 4/1974 | Goerens et al. | 250/342 |
| 3,929,444 | 12/1975 | May et al. | 65/182 R |
| 3,977,858 | 8/1976 | Taguchi | 65/158 |
| 3,998,616 | 12/1976 | Farabaugh | 65/29 |
| 4,008,062 | 2/1977 | Nishikori et al. | 65/158 |
| 4,046,549 | 9/1977 | Miller et al. | 65/182 R |
| 4,078,911 | 3/1978 | Green et al. | 65/29 |
| 4,100,680 | 7/1978 | Rough, Sr. et al. | 33/126.7 A |
| 4,152,135 | 5/1979 | Kapura | 65/182 R |

Primary Examiner—Arthur D. Kellogg
Attorney, Agent, or Firm—Donald Carl Lepiane; Lee Patch; Dennis G. Millman

[57] ABSTRACT

A method of vertically positioning ribbon engaging devices in a glass forming chamber includes suspending a contact member within the chamber a known vertical distance relative to the device, moving the contact member toward the surface of a pool of molten metal contained within the glass forming chamber while moving the device to maintain the known vertical distance; and generating a signal when the contact member engages the pool of molten metal to indicate that the device is vertically positioned said known vertical distance from the surface of the pool of molten metal.

19 Claims, 6 Drawing Figures

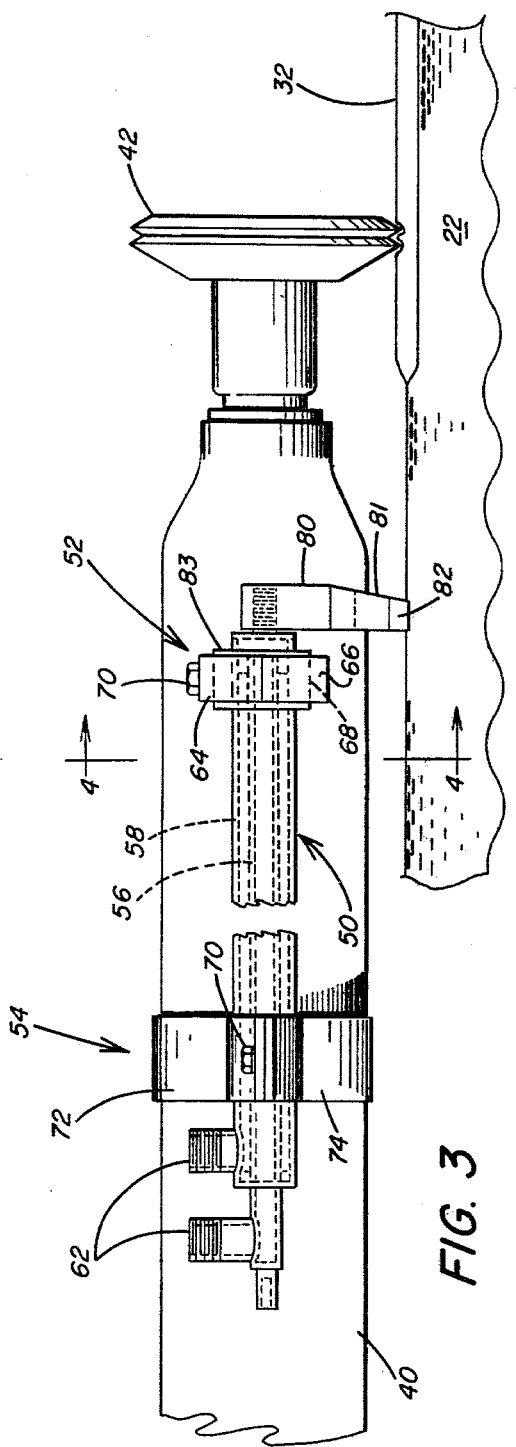
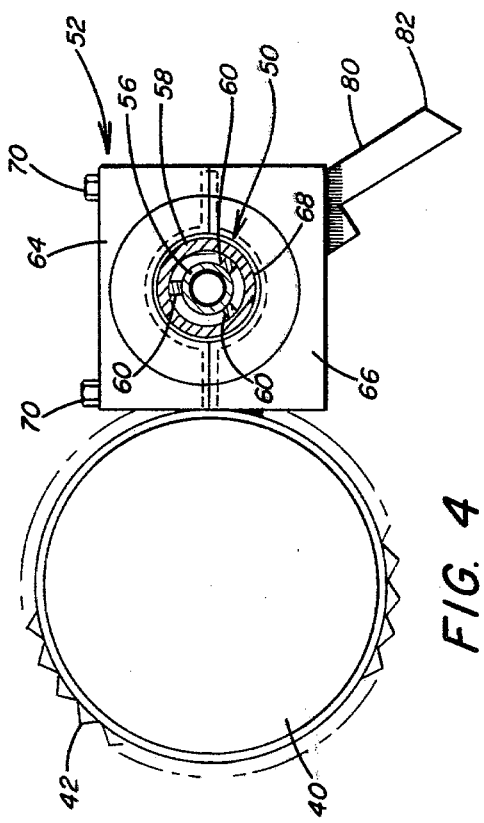
FIG. 3
FIG. 4

4,345,929

METHOD OF AND APPARATUS FOR VERTICALLY POSITIONING DEVICES IN GLASS FORMING CHAMBER

BACKGROUND OF THE INVENTION

1. Field of the Invention

The present invention relates to a method of and apparatus for vertically positioning conditioning devices, e.g., edge roll wheels, heaters, coolers, and/or linear induction motors, in a glass forming chamber.

2. Description of the Technical Problem

In the manufacture of flat glass, molten glass exits a furnace onto a pool of molten metal, where it advances downstream and is controllably cooled to form a glass ribbon. During the process of forming the glass ribbon on the molten metal pool it is often desirable to act on the ribbon and/or the molten metal pool with devices inserted into the forming chamber, e.g., ribbon edge gripping devices, heating devices, cooling devices, and molten metal circulating devices. There is a need when utilizing such devices for a technique which assures their accurate positioning within the bath with respect to the surface of the molten metal pool.

For example, edge roll devices are generally inserted in opposed pairs into the forming chamber to exert longitudinal and outwardly lateral components of force upon the marginal edge portions of the ribbon. The depth of engagement, or bite, of each edge roll wheel with the ribbon determines in part the magnitude of the force exerted thereby. To equalize the force exerted by each one of a pair of opposed edge rolls, the bite must be determinable and controllable. An imbalance in forces may result in ribbon instability or dislocation.

Numerous patents teach methods of and apparatus for detecting the horizontal location of and/or the positioning of devices relative to the marginal edge of a ribbon of glass in a forming chamber, including U.S. Pat. Nos. 3,482,954; 3,500,548; 3,805,072; 3,977,858; 3,998,616; and 4,008,062. None of the referenced patents, however, teach a method of or apparatus for vertically positioning devices relative to the surface of the molten metal pool, e.g., to determine bite depth of an edge roll wheel.

U.S. Pat. No. 2,380,436 to Holdman generally teaches apparatus for indicating the level of molten glass in a melting tank, including a fluid cooled shaft which extends into the melting tank and supports an electrical contact therein. The level of the molten glass is generally detected by rotating the electrical contact into engagement with the electrically conductive molten glass to generate an electrical signal. While useful for the purpose of monitoring electroconductive fluid levels, the subject patent does not address the problem of conveniently vertically positioning conditioning devices in a glass forming chamber.

U.S. Pat. No. 4,078,911 to Green et al. generally teaches a method of determining the relative elevations of components of a float glass facility, in which the surface of the molten metal bath is utilized as a reference plane. Generally, the elevation of an adjustably mounted structural component of the float glass facility is determined relative to the surface of the pool of molten metal through the use of a surveyor's level, a reference scale, and a vertically adjustable gauge device. An arm of the gauge device is inserted into the float chamber and a probe mounted thereto is lowered into point contact with the pool of molten metal. An electrical signal may be generated to indicate the occurrence of such point contact. The surveyor's level is then utilized to observe the relative elevations of a reference mark on the probe and a reference point on the structural component the position of which is to be determined. While the disclosed technique may be useful in accurately determining relative elevations in a float glass facility, it may prove cumbersome and time consuming when utilized to reposition relatively portable conditioning devices within the float chamber. It would be advantageous to have a method of and apparatus for conveniently vertically positioning conditioning devices within a float chamber which avoids the limitations previously noted.

SUMMARY OF THE INVENTION

The present invention relates to a method of and apparatus for vertically positioning devices in a glass forming chamber, relative to the surface of the pool of molten metal contained therein. A conditioning device, e.g., an edge roll wheel, is mounted in the chamber, and an electroconductive element, e.g., a graphite finger, is suspended over the pool of molten metal a first known vertical distance from the conditioning device. An electrical circuit is provided in which the electroconductive element is a first contact member and the pool of molten metal is a second contact member. A detectable signal is generated when the two contact members electrically communicate. The electroconductive element is displaced toward the pool of molten metal to a position where the two contact members electrically communicate and the signal is generated. The vertical displacement of the electroconductive element relative to the conditioning device is determined and the conditioning device is then moved in response to the first known vertical distance and the vertical displacement to its desired position relative to the pool of molten metal. Preferably, the first known vertical distance is preset to equal the desired final distance between the conditioning device and the surface of the molten metal pool, and the electroconductive element is displaced simultaneously and equidistantly with the conditioning device, so that the conditioning device occupies its desired position when the electroconductive element contacts the molten pool to generate the signal.

BRIEF DESCRIPTION OF THE DRAWINGS

FIG. 3 is an enlarged elevated view of the ribbon engaging end of the apparatus of FIG. 2, with portions removed for purposes of clarity.

FIG. 4 is a view taken along line 4—4 of FIG. 3, showing fluid cooling and electrical insulating features of the apparatus according to the present invention.

DESCRIPTION OF THE INVENTION

Figure 1:
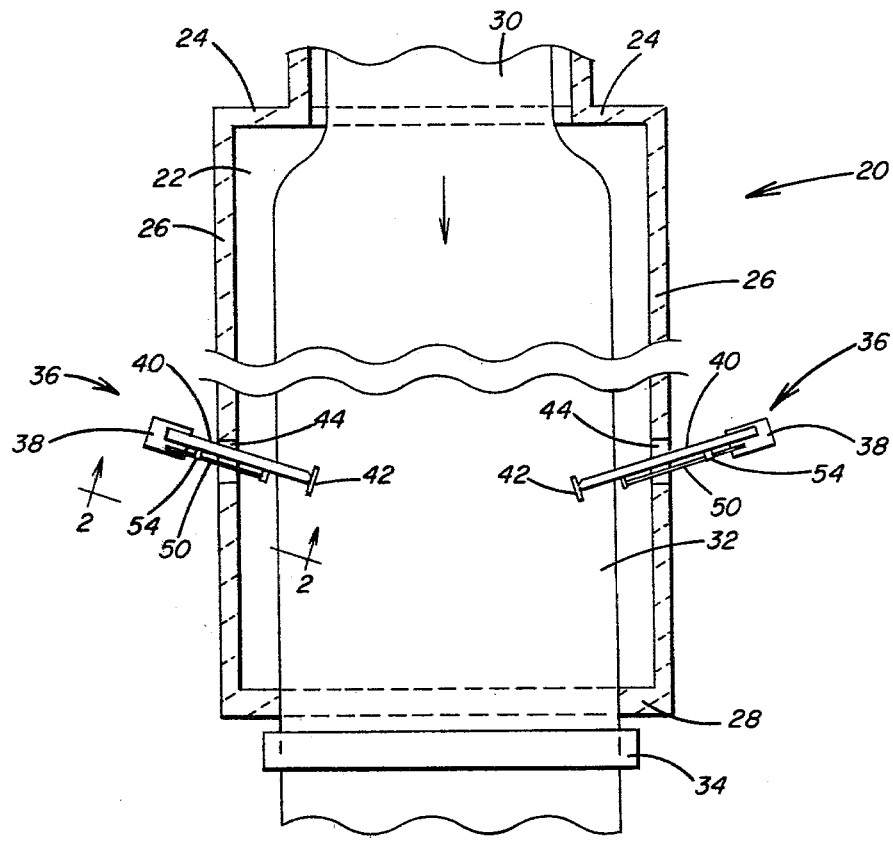
FIG. 1 is a sectional plan view of a flat glass forming chamber including features of the present invention for vertically positioning ribbon engaging devices relative to the pool of molten metal.

With reference to FIG 1, there is shown a glass forming chamber 20 in which a pool of molten metal 22, e.g., tin or an alloy thereof, is contained by a refractory entry wall 24, refractory side walls 26, and a refractory exit wall 28. A stream of molten glass 30 flows downstream from a glass furnace (not shown) onto the molten metal pool 22 and is advanced in the direction of the arrow, controllably cooled, and attenuated thereon to form a dimensionally stable ribbon 32 having a desired thickness and width. The ribbon 32 is then lifted from the molten metal pool 22 by lift out rolls 34 located adjacent the refractory exit wall 28. The ribbon 32 may thereafter be conveniently annealed in an annealing lehr (not shown).

Figure 2:
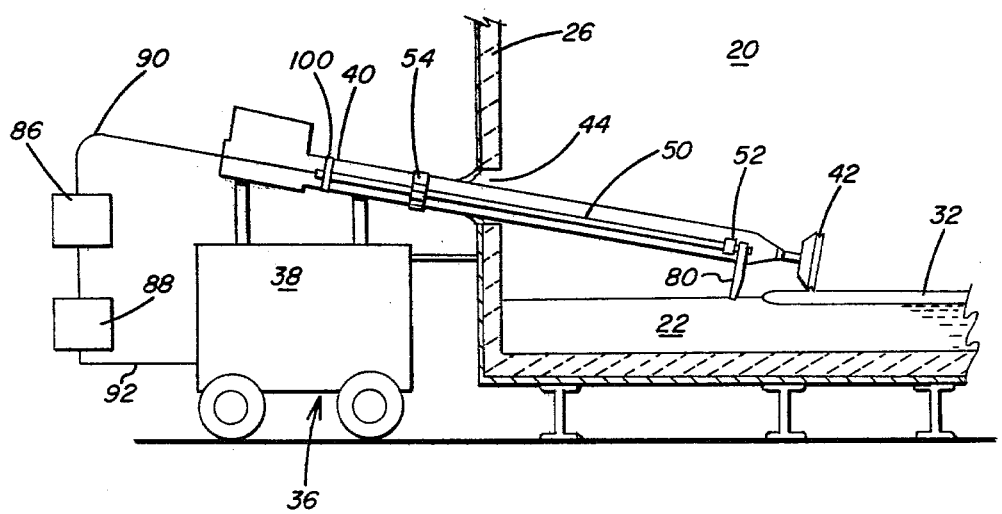
FIG. 2 is a view taken along line 2—2 of FIG. 1, further showing schematically illustrated electrical circuitry useful in vertically positioning ribbon engaging devices relative to the molten metal pool in accordance with the teachings of the invention.

As shown in FIGS. 1 and 2, it is commonly the practice in the flat glass industry to engage the marginal edge portions of the ribbon 32 with edge gripping devices, e.g., edge roll machines 36, to exert longitudinal and lateral attenuating forces thereto.

Edge roll machines 36 which may be used in the practice of the present invention generally include a carriage assembly 38 which adjustably supports an elongated barrel 40, to the end of which is mounted a rotatable edge roll wheel 42. As shown in FIGS. 1 and 2, the barrel 40 is inserted through an opening 44 in the sidewall 26 a distance sufficient to enable the edge roll wheel 42 to extend over the exposed marginal portion of the molten metal pool 22 and engage the marginal edge portion of the ribbon 32. Suitable edge roll machines 36 which may be used in the practice of the present invention but not limited thereto, include those taught in U.S. Pat. Nos. 3,709,673 to Bishop; 3,929,444 to May et al.; 3,998,616 to Farabaugh which teachings are hereby incorporated by reference.

As shown in FIG. 1, preferably the edge roll machines 36 are utilized in opposed pairs, each machine preferably exerting an equal magnitude of attenuating force to the ribbon 32. In this manner the ribbon position can be stabilized with respect to the sidewalls 26, preferably centrally therebetween. Attenuating forces exerted by an individual edge roll machine 36 are determined by the angular velocity of the edge roll wheel 42, the angle of engagement between the wheel 42 and the ribbon 32, and the depth of engagement between the wheel 42 and the ribbon 32. The former two considerations are readily controllable, but heretofore, there has been lacking a precise method for controlling the depth of engagement, or bite, of the wheel 42. Commonly, the bite is visually observed and adjusted, a technique which proves particularly unsatisfactory when opposed pairs of machines 36 must be simultaneously repositioned, each by an individual workman subjected to intense heat and possible visual impairment. Differences between the bite of opposed edge roll machines 36 causes the ribbon to displace toward the edge roll machine 36 with the greater bite. The present invention provides a precise method for determining and establishing a desired bite of the edge roll wheel 42 which permits equalizing the bite on opposed pairs of edge roll machines 36 and remote control adjustment thereof.

With reference to FIGS. 1, 2, 3, and 4, an elongated shaft 50 is mounted to the barrel 40 in parallel relation thereto by an inboard bearing assembly 52 and a outboard collar assembly 54. The shaft 50 extends through the opening in the sidewall 26 into the chamber 20 and generally terminates short of the end of the barrel 40 therein so as to overlie the uncovered marginal edge of the pool of molten metal 22 when the edge roll wheel 42 is in position over the marginal edge portion of the ribbon 32. Preferably the shaft 50 is mounted to the downstream side of the barrel 40 for reasons to be discussed more fully below.

The shaft 50, as best shown in FIGS. 3 and 4, includes an inner pipe 56 spaced from and mounted within an outer pipe 58 by support members 60. The area within inner pipe 56, and the area between the inner pipe 56 and outer pipe 58 serve as fluid input and output passage, respectively, and are fed through fluid couplings 62 which are located near the outboard end of shaft 50.

The bearing assembly 52 includes an upper block member 64 and a lower block member 66, between which the shaft 50 is rotatably supported by a ceramic bearing 68. As best shown in FIG. 4, the lower member 66 is mounted, e.g., welded, to the barrel 40 and the upper member 64 is removably mounted to the lower member 66 by fasteners 70, e.g., bolts.

The collar assembly 54, as best shown in FIG. 3, includes an upper plate 72 and a lower plate 74 which, when assembled by fasteners 70, enclose the barrel 40 and the shaft 50 and maintain them in a fixed parallel orientation. A second ceramic bearing (not shown but similar to bearing 68) supports the shaft 50 within the collar assembly 54.

Ceramic bearings 68 which are suitable for use in the present invention are preferably resistant to high temperature, so as to withstand the hostile environment of the forming chamber 20, and additionally should serve as electrical insulators, so as to electrically isolate the shaft 50 from the barrel 40. A preferred material which may be cast as a ceramic bearing 68 is silica cement, e.g. a product marketed under the trademark Thermosil Castable, available from Thermo Materials Co.

An electroconductive element 80, e.g., a graphite finger, is mounted to the inboard end of the shaft 50 in electrical continuity therewith. Preferably the graphite finger 80 is elongated and, as will be appreciated from FIGS. 3 and 4, may be rotated through an arcuate path to position the lower extremity of the graphite finger 80 either lower or higher than the bottom edge of the edge roll wheel 42. Although not limiting to the invention, it is preferred that the lower extremity of the graphite finger 80 be shaped so as to provide a consistent contact point with the pool of molten metal 22, independent of the angle of engagement therewith. Accordingly, as shown best in FIG. 3, the lower inboard surface 81 of the graphite finger 80 may be tapered toward its lower end, as may be the lower downstream surface 82 thereof, as best shown in FIG. 4. An electrically insulating fiber washer 83 is slidably positioned on the shaft 50 and captured between the graphite finger 80 and the bearing assembly 52 to assure that the graphite finger 80 remains electrically isolated from the barrel 40, e.g. when the shaft 50 is moved to the left within bearing assembly 52 in FIG. 3. The graphite finger 80 is preferably formed of solid graphite stock available from Airco-Speer, Inc. of St. Marys, Pa. as ATJ.

Referring now to FIG. 2, a source of electrical potential 86 and a continuity indicator 88 are provided outside the chamber 20, in electrical communication with the outboard end of the shaft 50 through a wire 90, and in electrical communication with the pool of molten metal 22 through a wire 92, the carriage 38, and the sidewall 26. Thus, when the graphite finger 80 is moved into contact with the molten metal pool 22, an electrical circuit is completed, and current flows from the source of electrical potential 86 through wire 90, electrically isolated shaft 50, graphite finger 80, the pool of molten metal 22, to carriage 38 and ground. Upon completion of the circuit the continuity indicator 88 receives and indicates a signal, thereby signifying that the graphite finger 80 has contacted the pool of molten metal 22.

Figure 6:
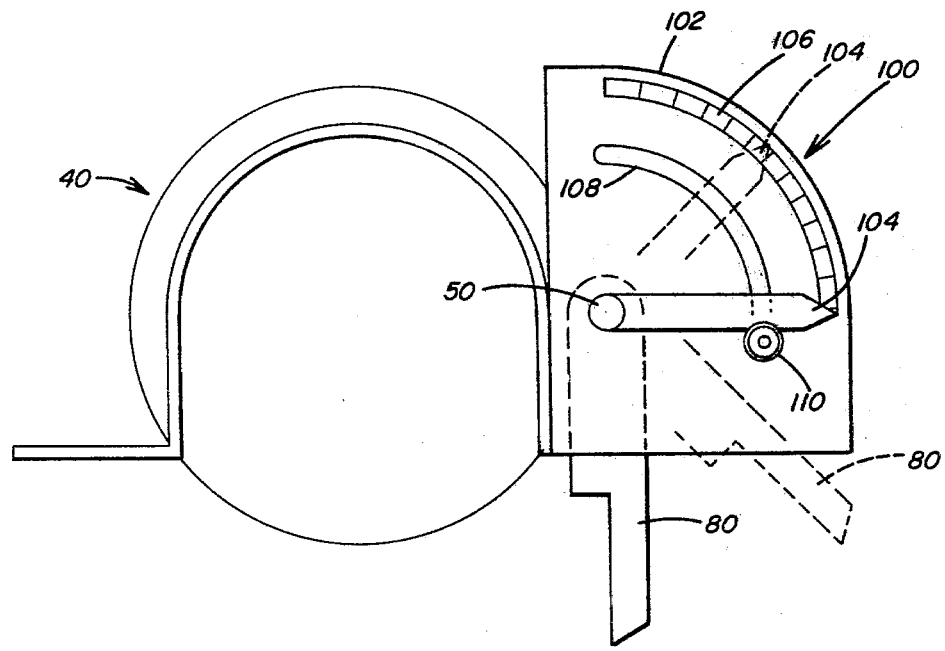
FIG. 6 is a view showing apparatus useful for indicating the relative positions of graphite finger and the ribbon engaging device of FIGS. 1-4, in accordance with the practice of the present invention.

Referring to FIG. 6, a position indicating mechanism 100 is conveniently mounted adjacent the outboard end of shaft 50. The mechanism 100 includes a stationary plate 102 through which the outboard end of the shaft 50 projects. An arm 104 is rigidly mounted to the outboard end of shaft 50 in a fixed relation to the orientation of the graphite finger 80, e.g., 90°, to rotate with the rotation of shaft 50 (as shown in phantom in FIG. 6.), and thereby indicate the position of the graphite finger 80 along a scale 106 imposed along stationary plate 102. An arcuate groove 108 and a tightenable stop member 110 allows the arm 104 to be set in a known position, thereby allowing the position of the graphite finger 80 to be set in a known position relative to the barrel 40.

In a first mode of operation, a pair of opposed edge roll machines 36 are positioned with barrels 40 inserted through sidewalls 26 a distance sufficient to position the edge roll wheels 42 over opposed marginal edge portions of the ribbon 32. The shafts 50 which parallel barrels 40 are each mounted on the downstream side thereof so that the graphite finger 80 will have freedom to rotate away from the barrels 40 should the ribbon 32 inadvertently widen and contact the graphite fingers 80. The graphite fingers 80 are rotated to predetermined identical positions relative to the edge roll wheels 42 as indicated on their respective position indicating mechanisms 100, preferably thereby establishing a vertical distance between the lowest point of graphite fingers 80 and the lowest point of the edge roll wheels 42, i.e., a first known vertical distance, which equals the desired distance between the surface of pool of molten metal 22 and the lowest point of the edge roll wheel 42 when the ribbon is engaged, i.e., a preselected vertical distance. The barrels 40 and shafts 50 are then preferably simultaneously lowered toward the pool of molten metal 22 until the graphite fingers 80 contact the pool of molten metal 22, at which time the continuity indicators 88 indicate a signal. Simultaneous lowering of the barrels 40 may be conveniently accomplished remotely by an operator who controls motorized raising and lowering means. Signals received from the continuity indicators 88 signify to the operator when lowering is to be terminated. At such time, both edge roll wheels 42 will have an equal predetermined depth of engagement, or bite, in the ribbon 32.

Figure 5:
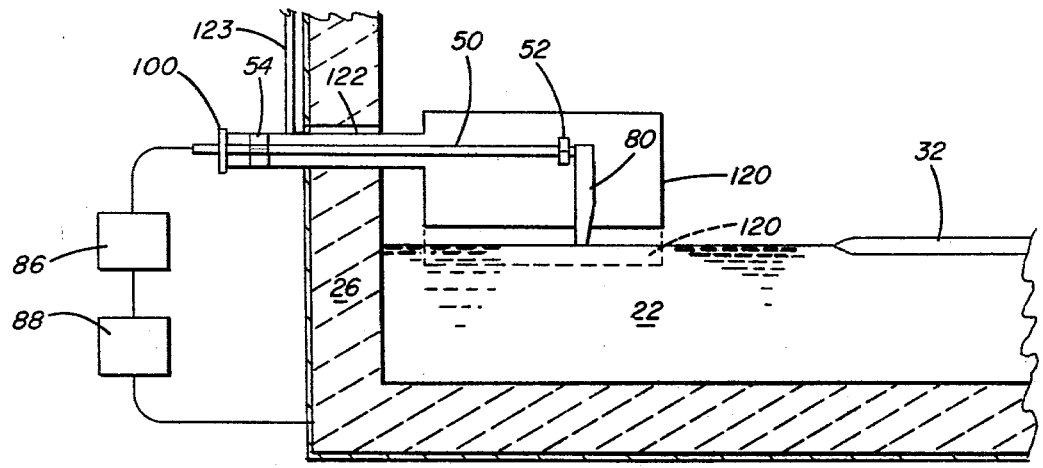
FIG. 5 is a view similar to FIG. 2 showing an alternate embodiment of the present invention, having portions removed for purposes of clarity.

Referring now to FIG. 5, there is shown an alternate embodiment of the present invention, practiced with a linear induction motor 120 such as one of the type taught in U.S. Pat. No. 3,453,460, which teachings are hereby incorporated by reference. The linear induction motor 120 is generally supported within the chamber 20 over the marginal edge of the pool of molten metal 22 by a support arm 122 and support assembly 123 to control the movement of the molten metal within the pool of molten metal 22 by electromagnetic induction. Support assembly 123 may be of the type taught in U.S. Pat. No. 4,046,549, which teachings are hereby incorporated by reference. It is desirable to precisely vertically position the linear induction motor 120 with respect to the pool of molten metal 22. For such purpose, a shaft 50 having a graphite finger 80 mounted thereto as previously discussed is conveniently secured to but electrically isolated from the linear induction motor 120 and its support arm 122 by a bearing assembly 52 and collar assembly 54. A source of electrical potential 86 and a continuity indicator 88 are provided and an electrical circuit is utilized to indicate contact between the graphite finger 80 and the pool of molten metal 22, as heretofore described. The linear induction motor 120 may be precisely positioned with respect to the pool of molten metal 22 in accordance with the general technique set forth above.

It will be understood by those skilled in the art that the present invention may be utilized to position conditioning devices a selected distance below the surface of the pool of molten metal 22, e.g., as shown in phantom in FIG. 5, by positioning the lowest point of the graphite finger 80 a preselected distance above the lowest portion of the conditioning device to be positioned. It will further be understood that element 120 in FIG. 5 might be representative of heating and/or cooling devices, as well as a linear induction motor.

EXAMPLE

Referring to FIGS. 1, 2, and 3, it might be desired to engage a pair of opposed edge roll wheels 42 equally to a depth of about 1/16 inch (0.16 cm) in a ¼ inch (0.63 cm) thick ribbon of glass 32 is moved downstream through the chamber 20. To effect such a result, the barrels 40 are inserted into the chamber 20 a distance sufficient to position the edge roll wheels 42 over the ribbon 32 and the graphite fingers 80 over the pool of molten metal 22. While suspended over the pool of molten metal 22, the graphite fingers 80 of each edge roll machine 36 may be rotated and set at a position where their lowest point extends 3/16 inch (0.48 cm) below the level of the lowest point of the edge roll wheels 42. Thereafter the edge roll wheels 42 and graphite fingers 80 may be lowered together toward the pool of molten metal 22 until the graphite finger electrically communicates with the pool of molten metal 22, as indicated by the continuity indicator 88. At the point of contact, the lowest point of the edge roll wheel 42 remains 3/16 inch above the pool of molten metal 22, thereby establishing a 1/16 inch (0.16 cm) bite between the edge roll wheel 42 and the ¼ inch (0.63 cm) thick ribbon 32.

It will be further understood that the present invention may be utilized to determine the current vertical position of a conditioning device relative to the pool of molten metal 22. In such a usage, a shaft 50 having a graphite finger 80 is rotatably mounted in a known vertical position relative to and electrically isolated from the conditioning device whose current position is to be determined. The graphite finger 80 is initially positioned in a non-contacting orientation with respect to the pool of molten metal 22, i.e., the graphite finger 80 is rotated to an upwardly extending position. Thereafter, the graphite finger 80 is rotated from the non-contacting position through an arc of travel until initial contact is made with the pool of molten metal 22, as signified by the continuity indicating mechanism 88. The vertical position of the contacting point of the graphite finger 80 relative to the vertical position of the conditioning device is thereafter determinable by reference to the position indicating mechanism 100.

It is not intended that the scope of the present invention be limited to the specific embodiments herein described, but rather, by the claims which follow.

I claim:

1. A method of vertically positioning a conditioning device in a glass forming chamber a preselected vertical distance relative to the surface of a pool of molten metal contained within the chamber upon which a ribbon of glass is supported, comprising the steps of:

suspending said conditioning device within said chamber;

mounting a contact member within said chamber in an initial position spaced from and above the surface of said pool of molten metal, said initial position a known vertical distance from said conditioning device equal to said preselected vertical distance;

moving said contact member from said initial position toward the surface of said pool of molten metal; while moving said conditioning device to maintain said known vertical distance equal to said preselected vertical distance; and generating a signal when said contact member engages the surface of said pool of molten metal to indicate that said conditioning device is positioned said preselected vertical distance relative to said pool of molten metal.

2. The method as set forth in claim 1 further comprising the steps of:

terminating said conditioning device moving step in response to said signal to maintain said conditioning device said preselected vertical distance relative to the surface of said pool of molten metal.

3. The method as set forth in claim 1 wherein said mounting step comprises the steps of:

movably mounting said contact member to said conditioning device; and, adjusting the position of said contact member to set said known vertical distance equal to said preselected vertical distance.

4. The method as set forth in claim 3 wherein said contact member is an electrically conductive first contact member, said mounting step further comprises the step of:

electrically isolating said first contact member from said conditioning device; and wherein said signal generating step comprises the step of:

providing an electrical circuit which generates a signal when said first contact member electrically communicates with a second contact member, said second contact member comprising the surface of said molten metal pool.

5. The method as set forth in claim 1 or 4 wherein said conditioning device comprises glass ribbon gripping apparatus, and wherein said preselected vertical distance defines a preselected depth of engagement between said apparatus and said glass ribbon.

6. The method as set forth in claim 1 or 4 wherein said conditioning device comprises a molten metal induction pump, and wherein said preselected vertical distance defines a preselected vertical distance between said pump and the surface of said pool of molten metal.

7. The method as set forth in claim 1 or 4 wherein said conditioning device comprises a heater, and wherein said preselected vertical distance defines a preselected vertical distance between said heater and the surface of a marginal edge portion of said glass ribbon.

8. The method as set forth in claim 1 or 4 wherein said conditioning device comprises a heater, and wherein said preselected vertical distance defines a preselected degree of submergence of said heater within said pool of molten metal.

9. The method as set forth in claim 1 or 4 wherein said conditioning device comprises a cooler, and wherein said preselected vertical distance defines a preselected vertical distance between said cooler and the surface of said pool of molten metal.

10. The method as set forth in claim 1 or 4 wherein said conditioning device comprises a cooler, and wherein said preselected vertical distance defines a preselected degree of submergence of said cooler within said pool of molten metal.

11. Apparatus for positioning a conditioning device in a preselected vertical position relative to a pool of molten metal which is contained in a forming chamber and upon which ribbon of glass is supported, comprising:

means for mounting said conditioning device within said chamber;

a contact chamber;

means for suspending said contact member in an initial position within said chamber over the pool of molten metal, said initial position a known vertical distance from said conditioning device which equals said preselected vertical distance;

means for generating a signal when said contact member engages said pool of molten metal;

means for moving said contact member from said initial position toward the surface of said pool of molten metal; and means for moving said conditioning device during movement of said contact member to maintain said known vertical distance equal to said preselected vertical distance.

12. The apparatus as set forth in claim 11, wherein said contact member comprises an electroconductive element and wherein said signal generating means comprises electrical circuit means which generates an electrical signal when said contact member electrically communicates with said pool of molten metal.

13. The apparatus as set forth in claim 12 wherein said contact member suspending means comprises:

means for movably mounting said contact member to said conditioning device; and means for electrically insulating said contact member from said conditioning device.

14. The apparatus as set forth in claim 13 further comprising:

means for presetting said known vertical distance to equal said preselected vertical distance.

15. The apparatus as set forth in claim 14 wherein said contact member suspending means further comprises: cooling fluid circulating means.

16. The apparatus as set forth in claim 11 or 15 wherein said conditioning device comprises a ribbon gripping device, and wherein said preselected vertical distance defines a preselected depth of engagement between said ribbon gripping device and said ribbon.

17. The apparatus as set forth in claim 11 or 15 wherein said conditioning device comprises a linear induction motor positioned over said pool of molten metal and wherein said preselected vertical distance defines a preselected distance between said linear induction motor and said pool of molten metal.

18. The apparatus as set forth in claim 11 or 15 wherein said conditioning device comprises a heating device.

19. The apparatus as set forth in claim 11 or 15 wherein said conditioning device comprises a cooling device.

* * * * *

UNITED STATES PATENT AND TRADEMARK OFFICE
CERTIFICATE OF CORRECTION

PATENT NO. : 4,345,929

DATED : August 24, 1982

INVENTOR(S) : Edward M. Kapura

It is certified that error appears in the above-identified patent and that said Letters Patent are hereby corrected as shown below:

Claim 11, column 8, line 19, "chamber" should read
--member--.

Signed and Sealed this

Nineteenth Day of October 1982

[SEAL]

Attest:

GERALD J. MOSSINGHOFF

Attesting Officer

Commissioner of Patents and Trademarks